United States Patent
Naas et al.

Patent Number: 5,369,602
Date of Patent: Nov. 29, 1994

[54] APPARATUS AND METHOD FOR DETERMINING RIDE HEIGHT

[75] Inventors: Dennis E. Naas, Woodson Terrace; Michael T. Stieff, Wentzville, both of Mo.

[73] Assignee: Hunter Engineering Company, Bridgeton, Mo.

[21] Appl. No.: 86,546

[22] Filed: Jul. 1, 1993

[51] Int. Cl.$^5$ .............................................. G01D 21/00
[52] U.S. Cl. ....................................... 364/562; 33/600; 33/203.18
[58] Field of Search ...................... 33/600, 203.18, 288, 33/336, 203, 501; 364/560, 561, 562, 463

[56] References Cited

U.S. PATENT DOCUMENTS

| | | | |
|---|---|---|---|
| 4,285,136 | 8/1981 | Ragan | 33/203.18 |
| 4,918,821 | 4/1990 | Bjork | 33/203.18 |
| 4,977,524 | 12/1990 | Strege et al. | 364/562 |

*Primary Examiner*—Jack B. Harvey
*Assistant Examiner*—Craig Steven Miller
*Attorney, Agent, or Firm*—Polster, Lieder, Woodruff & Lucchesi

[57] ABSTRACT

Apparatus for determining ride height includes an adapter removably mountable on a wheel of a vehicle while the wheel is mounted on the vehicle, an arm movably mounted with respect to the adapter for movement from a rest position to extended, measuring positions, and distance determining circuitry. The arm has a first end for contacting the vehicle when the arm is extended, contact between the arm and the vehicle halting movement of the arm. The distance traveled by the arm from its rest position to contact with the vehicle is a function of the ride height of the vehicle. The circuitry determines the distance of travel of the arm from its rest position to contact with the vehicle and determines ride height from the distance of travel. The method of determining ride height includes mounting a sensor housing on a wheel of a vehicle while the wheel is mounted on the vehicle, which sensor housing contains at least one sensor for obtaining wheel alignment measurements and defines a path therein. A ride height measuring arm is moved along the path in the sensor housing from a rest position until the measuring arm contacts the vehicle, the distance traveled by the measuring arm from its rest position to contact with the vehicle being a function of the ride height of the vehicle. The distance of travel of the measuring arm from its rest position to contact with the vehicle is determined to find ride height.

21 Claims, 3 Drawing Sheets

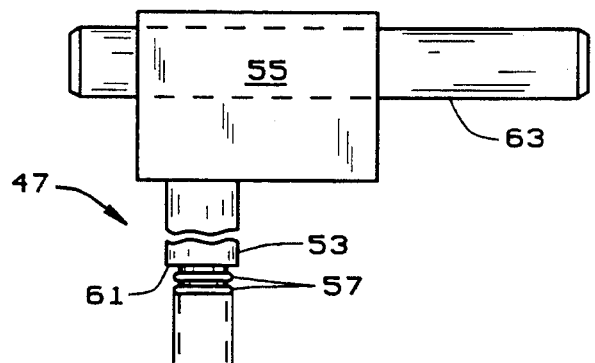
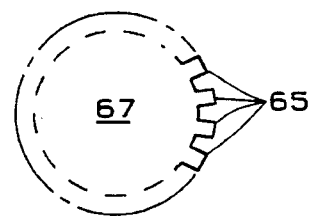
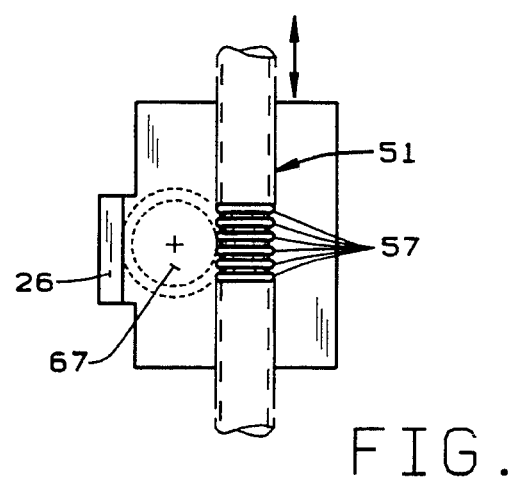
FIG. 5
FIG. 6
FIG. 7
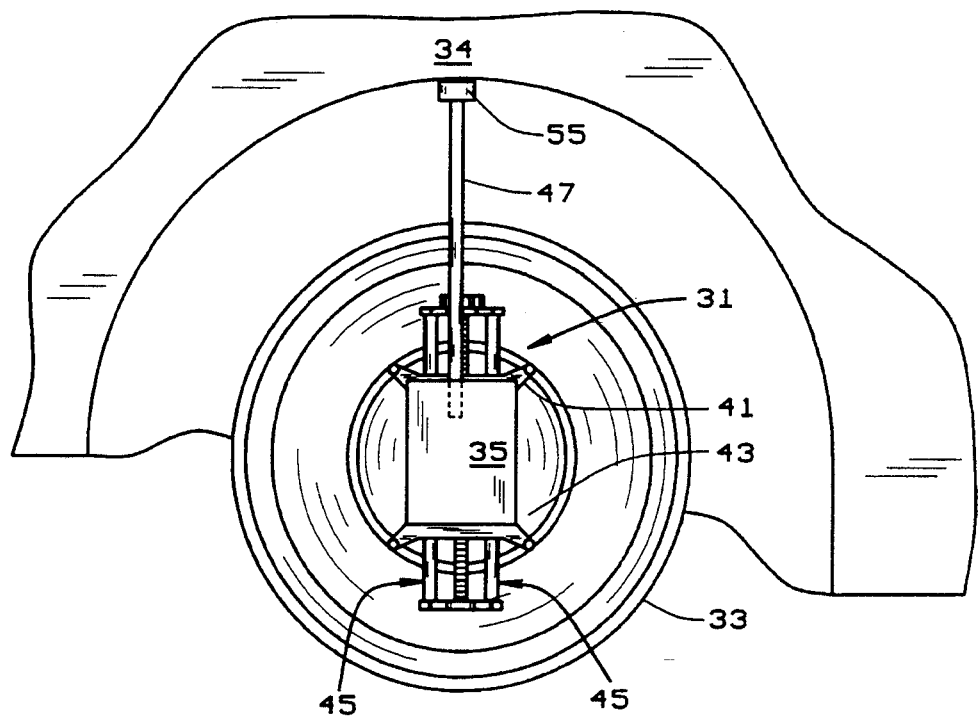
FIG. 8

APPARATUS AND METHOD FOR DETERMINING RIDE HEIGHT

BACKGROUND OF THE INVENTION

This invention relates to vehicle service apparatus and more particularly to measuring vehicle ride height.

The ride height of a vehicle may be defined in various ways. For example, some manufacturers specify ride height as the distance from the ground to the vehicle bumper, while others may use the distance between the center of a wheel (or some other reference point) and the vehicle body wheel arch for that wheel. No matter how defined, the ride height typically changes over time. These changes result from wear of or damage to the suspension components or incorrect adjustment, and can be evidence of serious alignment problems. Some manufacturers provide specifications for ride height which, if ignored, can result in failure to adequately diagnose and repair misalignment of the vehicle.

U.S. Pat. No. 4,977,524 to Strege et al (co-assigned with the present application) discloses an electronic measuring gauge for measuring ride height which supplies the measured ride height to a vehicle inspection/alignment system. That electronic measuring gauge was hand held by the technician/user and was connected by a separate cable to the inspection/alignment system console. The console included a computer with a memory which compared the measured ride height from the hand held measuring gauge with stored specifications for ride height.

Although the prior art ride height measuring devices worked adequately, they could be improved. Hand held measuring devices, for example, tend to be prone to human error in placement and the like. Such errors in placement with a hand held device can occur at either the upper or lower measuring point (e.g., at the wheel arch, bumper or other upper measuring point on the one hand, or at the wheel axle, ground or other lower measuring point on the other), or at both. Moreover, the prior art devices were not necessarily readily usable when other measuring equipment, such as wheel alignment sensors, were already mounted on the wheel. This could necessitate a two-step process in which the ride height measuring gauge was used first and then the wheel alignment sensor was mounted on the wheel, or vice versa.

Moreover, when the ride height is referenced to the measurement is subject to error because it depends in that case on tire pressure and/or tire size. Heretofore, apparatus for converting a ground-to-upper reference point ride height specification to a corresponding specification which does not depend upon tire pressure or tire size has not been available.

SUMMARY OF THE INVENTION

Among the various objects and features of the present invention may be noted the provision of an improved apparatus for measuring ride height.

Another object is the provision of such an improved apparatus which is usable when wheel alignment sensors are already mounted on the vehicle.

A third object is the provision of such an improved apparatus which substantially eliminates human error in the placement of the apparatus.

A fourth object is the provision of such an improved apparatus which is compatible with existing wheel alignment systems.

A fifth object is the provision of such an improved apparatus which is does not interfere with the use of existing wheel alignment systems.

A sixth object is the provision of such an improved apparatus which provides accurate ride height measurements independently of tire pressure and tire size.

Other objects and features may be in part apparent and in part pointed out hereinafter.

Briefly, ride height determining apparatus of the present invention includes an adapter removably mountable on a wheel of a vehicle while the wheel is mounted on the vehicle. A member is movably mounted with respect to the adapter for movement from a rest position to extended, measuring positions. The member has a first end for contacting the vehicle when extended. The distance traveled by the member from its rest position to contact with the vehicle is a function of the ride height of the vehicle. Circuitry is included for determining the distance of travel of the member from its rest position to contact with the vehicle and for determining ride height from the distance of travel.

A method of the present invention concerns determining ride height of a vehicle body with respect to an axis of a wheel of the vehicle. The method includes the step of mounting a sensor housing on a wheel of a vehicle while the wheel is mounted on the vehicle, which sensor housing contains at least one sensor for obtaining wheel alignment measurements and includes a path therein. A ride height measuring member is moved along the path in the sensor housing from a rest position until the measuring member contacts the vehicle, the distance traveled by the measuring member from its rest position to contact with the vehicle being a function of the ride height of the vehicle. The distance of travel of the measuring arm from its rest position to contact with the vehicle is determined and the ride height is calculated using that distance.

BRIEF DESCRIPTION OF THE DRAWINGS

FIG. 5 is a side view of a ride height measuring arm of the present invention;

FIG. 6 is a top view of a pinion used with the ride height measuring arm of FIG. 5;

FIG. 7 is an elevation illustrating the operation of the ride height measuring arm of FIG. 5 and the pinion of FIG. 6; and FIG. 8 is a view similar to FIG. 4 showing the ride height measuring arm of FIG. 5 extended to its measuring position.

Similar reference characters indicate similar parts throughout the several views of the drawings.

DESCRIPTION OF THE PREFERRED EMBODIMENT

Figure 1:
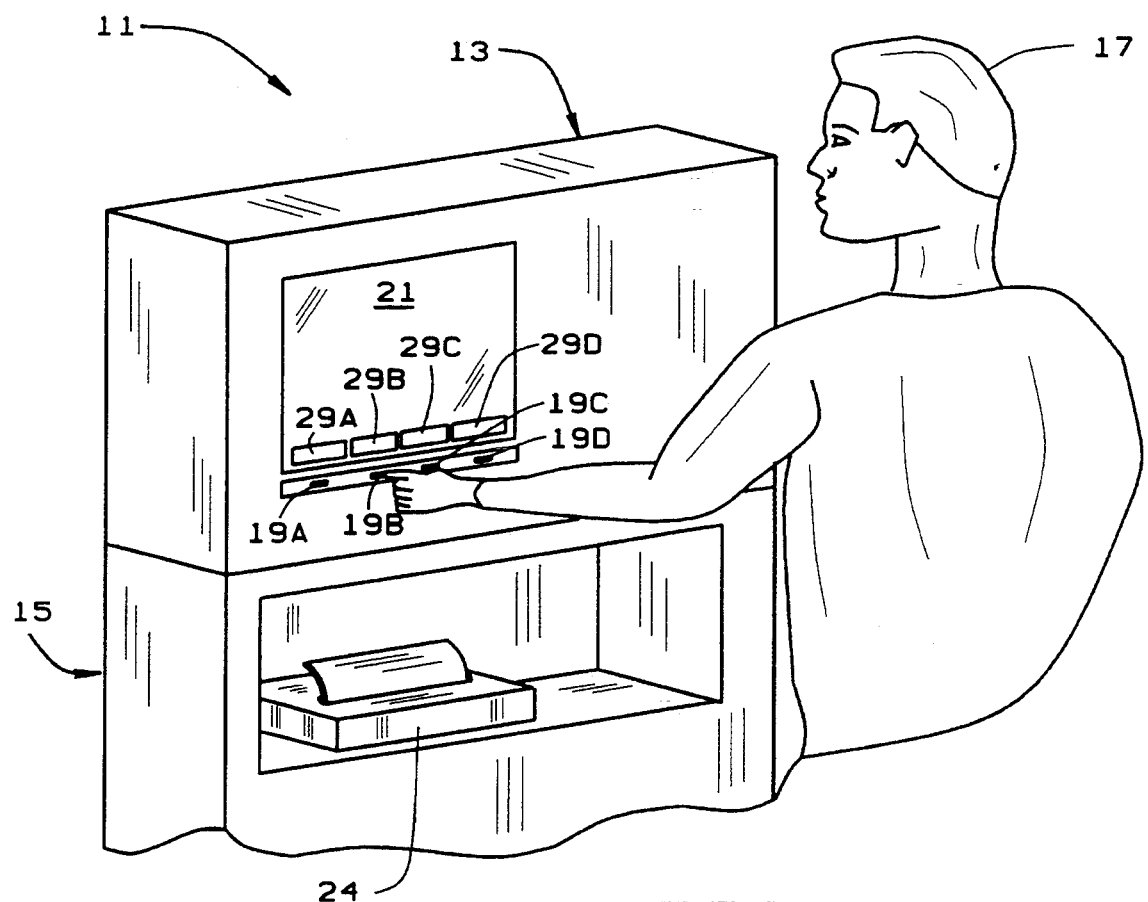
FIG. 1 is a perspective view of a vehicle alignment system console (with a technician/user) usable with the present invention.
Figure 2:
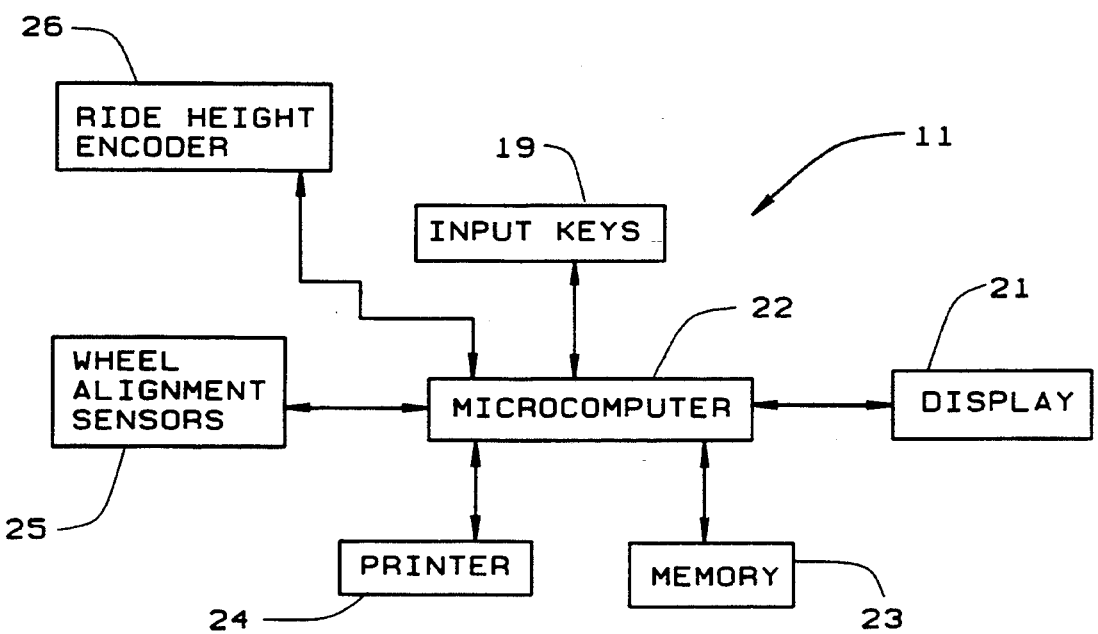
FIG. 2 is a block-diagram of the circuitry of the system of FIG. 1.
Figure 3:
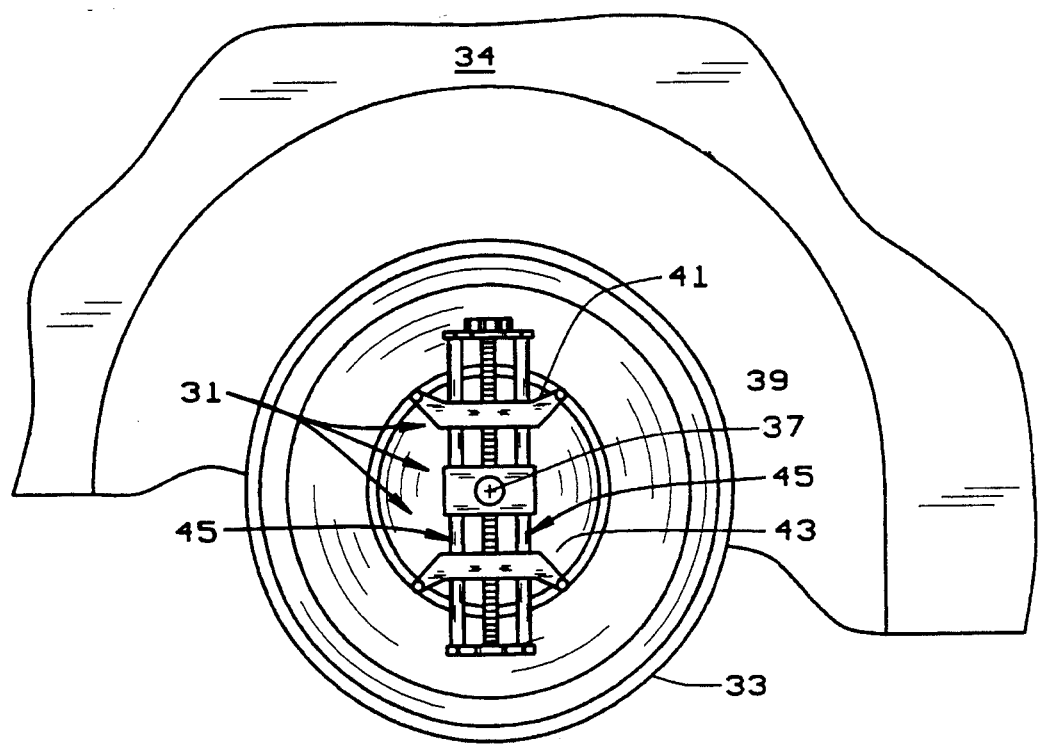
FIG. 3 is a front elevation of an adapter used in the present invention mounted on a wheel/tire assembly of a vehicle whose ride height is to be measured.

Turning to the drawings, and more particularly to FIGS. 1 and 2, there is shown a vehicle wheel alignment system 11 for use with the ride height measuring apparatus of the present invention. Alignment system 11 includes a console 13 suitably mounted on a stand 15 for use by a technician/user 17. Console 13 includes a set of manually operable input keys or switches 19(A–D) and a display 21.

Input keys 19 and display 21 are connected to a microcomputer 22 which functions as an electronic controller to control the operation of system 11. Any number of different microcomputers may be used in system 11, depending upon the other requirements of the system. Microcomputer 22 is shown in FIG. 2 connected to a digital memory 23, and a printer 24. It should be understood that memory 23 could be internal to microcomputer 22, depending upon the particular microcomputer used. In addition, other peripheral devices (not shown) could be connected to microcomputer 22 as desired.

A plurality of wheel alignment sensors 25 are operatively connected to microcomputer 22 for supplying alignment information to the microcomputer. The use of such sensors to measure alignment characteristics is, of course, well known. See, U.S. Pat. No. Re33,144 to Hunter et al., No. 4,381,548 to Grossman et al., and No. 4,879,670 to Colarelli, the disclosures of which are incorporated herein by reference.

Microcomputer 22 is also connected to a ride height encoder 26 (discussed below), which system 11 uses to determine the ride height of the vehicle under test.

The bottom of display 21 contains four variable function blocks 29A–D (the display of which is controlled by microcomputer 22). Function blocks 29A–D are disposed directly over corresponding switches 19A–D and display to the user the function of those switches at that particular time in the program which controls the operation of microcomputer 22.

Turning to FIGS. 3–8, the ride height determining apparatus of the present invention includes an adapter 31 removably mountable on a wheel/tire assembly 33 of a vehicle 34 (only a portion of which is shown in the FIGS.), the wheel/tire assembly being mounted on the vehicle. Such adapters are known in the art, and are conventionally used to mount a sensor housing 35 (FIG. 4) containing wheel alignment sensors 25 in a fixed geometrical relationship with the axis 37 (FIG. 3) of the wheel.

Adapter 31 is designed to fit numerous sizes of wheels, but is constructed so that its center mounting plate 39 remains centered over wheel axis 37. This is accomplished by moving upper and lower arms 41, 43 along parallel tracks 45 equal distances until the arms are stopped by contact with the wheel. As a result there is always a fixed geometrical relationship between the mounting plate of adapter 31 and the wheel axis.

Adapter 31 has conventionally mounted thereto sensor housing 35 which differs from a conventional wheel alignment sensor housing in that it has a path therein for linear movement of an arm 47. Arm 47 is completely removable from sensor housing 35 (or any equivalent separate housing providing a guide path for the arm) so that the arm may be taken out of the way except for those times when a ride height measurement is being made.

Arm 47 is roughly one and one-half feet in length and includes (see FIG. 5) a lower shaft portion 51 terminating in an upper shaft portion 53, which in turn terminates in a block 55. The two shaft portions are made of glass filled nylon rod (or any other suitable material). The lower shaft portion is machined or molded to have a series of longitudinally disposed rings 57 disposed substantially along the entire length of the lower shaft portion. As a result, the lower shaft portion functions as a rack in a rack and pinion system described below.

Upper shaft portion 53 is of slightly larger diameter than the lower shaft portion so as to provide a shoulder 61 between the two portions. This shoulder provides a natural stop for arm 47, as described below. Of course the bottom portion of lower shaft portion 51 could also serve the function of a stop. Upper shaft portion 53 terminates at its upper end in block 55. The block further serves to mount a finger 63 in fixed geometrical relationship with the shaft.

The rings 57 on lower shaft portion 51 are evenly spaced to engage the teeth 65 in a pinion 67 (FIGS. 6 and 7) so that linear motion of lower shaft portion 51 along the path in the housing results in corresponding rotation of the pinion. Pinion 7 (see FIG. 7) is operatively connected to encoder 26, so that the output of the encoder is an electrical signal indicative of the movement of lower shaft portion 51 with respect to the housing. It should be noted that since encoder 26 is disposed adjacent the wheel alignment sensors, the same electrical cabling (or other communications channel) may be used to send the signal from the encoder back to the microcomputer that is used to carry the wheel alignment sensor signals.

Figure 4:
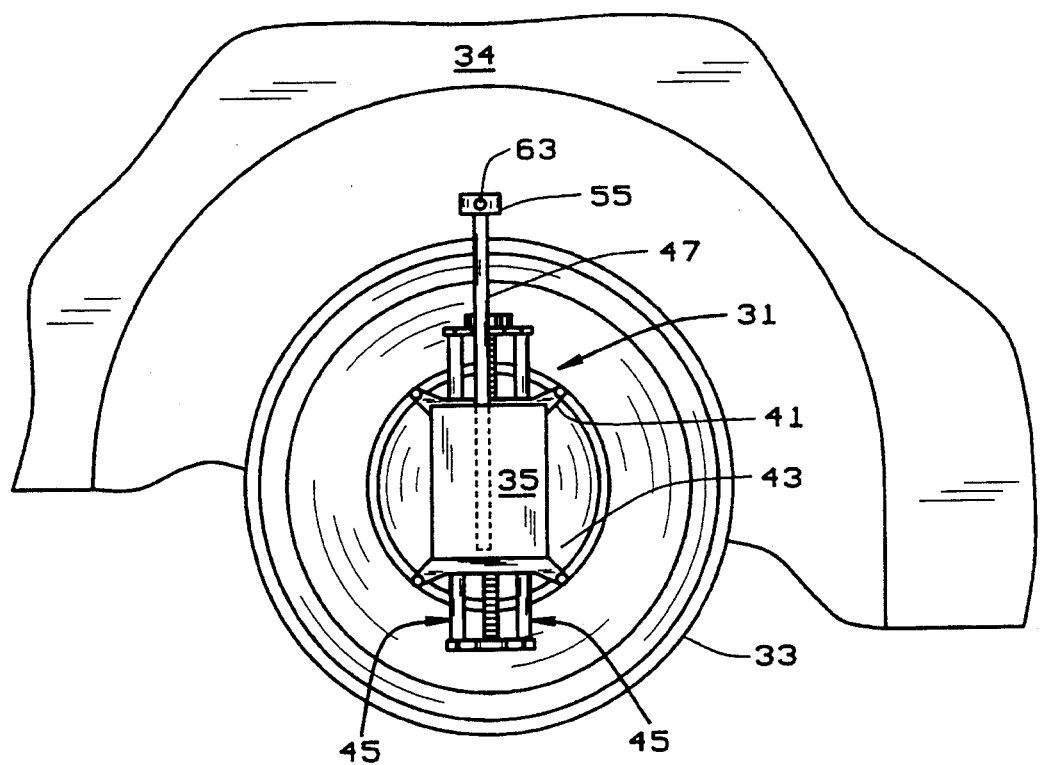
FIG. 4 is a view similar to FIG. 3 showing the ride height measuring apparatus of the present invention mounted to the adapter of FIG. 3.

In operation, the technician 17 manually takes arm 47 and places it in the path or track in housing 35 and lets the arm move downwardly to its rest position (shown in FIG. 4). The microcomputer observes the output of the ride height encoder 26 during this time. When the output of the encoder remains the same for longer than a preset interval, the microcomputer assumes that the arm has moved to its rest position. Although the preset interval is of no real significance, it should be relatively short since the technician upon moving the arm to its rest position will generally rather quickly start moving the arm upwardly to take the ride height measurement. The arm is rotated so that the finger 63 faces toward the vehicle (as shown in FIG. 8) or to some other desired measuring position. This is to ensure that as the arm is moved vertically upwardly with respect to the sensor housing, finger 63 will engage the wheel arch of vehicle 34 and halt further upward movement of the arm.

Microcomputer 22 keeps track of the output from encoder 26 as the arm is moved vertically upwardly along the path from its rest position to the extended position (shown in FIG. 81) in which the finger engages the wheel arch. Once the pulses from the encoder stop (i.e., no further pulses are received over predetermined time interval), microcomputer 22 concludes that the finger has engaged the wheel arch. The number of pulses from the encoder during this movement is directly proportional to the distance traveled by the arm. The microcomputer therefore converts the encoder pulses to a distance of arm travel. Since the arm in its rest position is in fixed geometrical relationship with the wheel axis independent of the type or size of wheel, the distance of arm travel determined by the microcomputer differs from the ride height only by a constant. The constant is, of course, the fixed distance between the wheel axis and the top of finger 63 when the arm is in its rest position. Microcomputer 22, therefore, adds the fixed distance to the measured distance of travel of the arm to obtain the ride height.

Once the microcomputer determines the ride height, it is displayed on display 21 or printed in a report on printer 24 (if desired). Of course, wheel alignment data can be displayed or reported at the same time. It is also preferred that memory 23 have stored therein ride height specifications for various vehicles, so that these specifications may be compared by microcomputer 22 with the measured ride height value. If those ride height specifications as supplied from the manufacturer are for a distance other than wheel-arch-to-wheel-axle, those specifications are converted to corresponding wheel-arch-to-wheel-axle specifications before storage in memory 23.

Once the ride height measurement is taken, the arm may be moved back down to its rest position (FIG. 4). If necessary, the arm may be rotated to prevent interference between finger 63 and the vehicle body before the measuring arm is moved vertically upwardly until it is completely removed from the sensor housing. This prevents ride height arm 47 from interfering with any subsequent use of the wheel alignment sensors. Alternatively, finger 63 may be loosely mounted in block 55 so that it may be moved outwardly and inwardly as needed to make or not make contact with the vehicle body as desired.

In view of the above, it will be seen that the various objects and features of the present invention are achieved and other advantageous results obtained. The description of the present invention contained herein is intended to be illustrative and not to be taken in a limiting sense.

What is claimed is:

1. Apparatus for determining ride height of a vehicle comprising:
   an adapter removably mountable on a wheel of a vehicle while the wheel is mounted on the vehicle;
   a member movably mounted with respect to the adapter for movement from a rest position to extended, measuring positions, said member having a first end for contacting the vehicle when the member is extended, the distance traveled by the member from its rest position to contact with the vehicle being a function of the ride height of the vehicle; and
   means for determining the distance of travel of the member from its rest position to contact with the vehicle and for determining ride height from said distance of travel, said distance determining means further including means for signaling movement of the member, said distance determining means further including means responsive to the movement signaling recalls for determining when the member is in its rest position.

2. The ride height determining apparatus as set forth in claim 1 wherein the member is mounted with respect to the adapter such that the distance between the wheel axis and the rest position of the member is fixed, independent of the type or size of the wheel.

3. The ride height determining apparatus as set forth in claim 1 further including a sensor housing mounted to the adapter, said sensor housing enclosing at least one sensor for obtaining wheel alignment measurements, said member being movably mounted to said sensor housing.

4. The ride height determining apparatus as set forth in claim 3 wherein the movement signaling means includes an encoder mounted with respect to the sensor housing.

5. The ride height determining apparatus as set forth in claim 4 wherein the encoder has an electric signal output, said means responsive to the movement signaling means including electronic circuitry responsive to the output of the encoder to determine the distance of travel of the member.

6. The ride height determining apparatus as set forth in claim 3 wherein the member is movably mounted to said sensor housing for generally vertical movement with respect thereto.

7. The ride height determining apparatus as set forth in claim 3 further including means for displaying to a user wheel alignment measurements obtained from said sensor and ride height measurements as determined by the distance determining means.

8. The ride height determining apparatus as set forth in claim 7 further including a data storage device for storing ride height specifications for a plurality of vehicles and means for comparing the measured ride height with the corresponding specification.

9. The ride height determining apparatus as set forth in claim 1 wherein the member is removably mounted with respect to the adapter.

10. The ride height determining apparatus as set forth in claim 1 wherein the member is an arm which includes a rack and the distance determining means includes a pinion operatively connected to said rack.

11. The ride height determining apparatus as set forth in claim 1 wherein the member is offset from the vertical plane containing the wheel axis.

12. Apparatus for determining ride height of a vehicle comprising:
    an adapter removably mountable on a wheel of a vehicle while the wheel is mounted on the vehicle;
    a member movably mounted with respect to the adapter for movement from a rest: position to extended, measuring positions, said member having a first end for contacting the vehicle when the member is extended, the distance traveled by the member from its rest position to contact with the vehicle being a function of the ride height of the vehicle; and
    means for determining the distance of travel of the member from its rest position to contact with the vehicle and for determining ride height from said distance of travel:
    a sensor housing mounted to the adapter, said sensor housing enclosing at least one sensor for obtaining wheel alignment measurements, said member being movably mounted to said sensor housing;
    an encoder mounted with respect to the sensor housing, said distance determining means including said encoder, said encoder having an electric signal output, the distance determining means including electronic circuitry responsive to the output of the encoder to determine the distance of travel of the member;
    wherein the electronic circuitry is responsive to the timing of signals from the encoder to determine when the member is at its rest position and when the member is in contact with the vehicle.

13. The ride height determining apparatus as set forth in claim 6 wherein the electronic circuitry has a preset predetermined time interval such that lack of change in the encoder output over a time period exceeding the predetermined time interval indicates that the member is motionless.

14. A method of determining ride height of a vehicle body, said method comprising:
   mounting a sensor housing on a wheel of a vehicle while the wheel is mounted on the vehicle, said sensor housing containing at least one sensor for obtaining wheel alignment measurements, said sensor housing including a path therein;
   moving a ride height measuring member along the path in the sensor housing from a rest position until the measuring member contacts the vehicle, the distance traveled by the measuring member from its rest position to contact with the vehicle being a function of the ride height of the vehicle;
   sensing movement of the measuring means and providing an electrical output that changes with movement of the member;
   determining that the member is in its rest position by examining said electrical output; and
   determining the distance of travel of the measuring member from its rest position to contact with the vehicle.

15. The method of determining ride height as set forth in claim 14 wherein the distance between the wheel axis and the rest position of the measuring member is fixed, independent of the type or size of the wheel.

16. The method of determining ride height as set forth in claim 14 further including the step of inserting the measuring member in the sensor housing path and moving it to the rest position before the step of moving the member to contact the vehicle.

17. The method of determining ride height as set forth in claim 14 further including the step of removing the measuring member from the sensor housing path after the step of moving the member to contact the vehicle.

18. The method of determining ride height as set forth in claim 14 further including the step of comparing the measured ride height with a predetermined specification for ride height.

19. The method of determining ride height as set forth in claim 14 wherein the measuring member is absent from the path except when a measurement of ride height is desired.

20. A method of determining ride height of a vehicle body, said method comprising;
   mounting a sensor housing on a wheel of a vehicle while the wheel is mounted on the vehicle, said sensor housing containing at least one sensor for obtaining wheel alignment measurements, said sensor housing including a path therein;
   moving a ride height measuring member along the path in the sensor housing from a rest position until the measuring member contacts the vehicle, the distance traveled by the measuring member from its rest position to contact with the vehicle being a function of the ride height of the vehicle; and
   determining the distance of travel of the measuring member from its rest position to contact with the vehicle:
   wherein the measuring member is operatively connected to an encoder having an output that changes with movement of the member, further including the step of determining that the member is in its rest position by examining the output of the encoder.

21. The method of determining ride height as set forth in claim 20 further including the step of determining that the member is in contact with the vehicle by examining the output of the encoder.

* * * * *

UNITED STATES PATENT AND TRADEMARK OFFICE
CERTIFICATE OF CORRECTION

PATENT NO. : 5,369,602
DATED : November 29, 1994
INVENTOR(S) : Dennis E. Nass, et al It is certified that error appears in the above-indentified patent and that said Letters Patent is hereby corrected as shown below:

Column 1, Line 50, after "to" insert -- ground --
    Column 1, Line 60, delete "prosent" and insert -- present --
    Column 4, Line 24, delete "7" and insert -- 67 --
    Column 4, Line 57, after "over" insert -- a --
    Column 5, Line 56, delete "recalls" and insert -- means --

Signed and Sealed this

Fourteenth Day of February, 1995

Attest:

BRUCE LEHMAN

Attesting Officer      Commissioner of Patents and Trademarks